US012110703B2

(12) United States Patent
Lebrija

(10) Patent No.: US 12,110,703 B2
(45) Date of Patent: Oct. 8, 2024

(54) MODULAR PRIVACY AND SOUND BARRIER FENCE SYSTEM

(71) Applicant: Roberto Lebrija, Torrington, WY (US)

(72) Inventor: Roberto Lebrija, Torrington, WY (US)

(73) Assignee: RRM Composites LLC., Denver, CO (US)

( * ) Notice: Subject to any disclaimer, the term of this patent is extended or adjusted under 35 U.S.C. 154(b) by 0 days.

(21) Appl. No.: 18/058,629

(22) Filed: Nov. 23, 2022

(65) Prior Publication Data

US 2023/0102631 A1 Mar. 30, 2023

Related U.S. Application Data

(63) Continuation-in-part of application No. 17/368,478, filed on Jul. 6, 2021, which is a continuation of
(Continued)

(51) Int. Cl.
*E04H 17/16* (2006.01)
*E04H 17/14* (2006.01)
(Continued)

(52) U.S. Cl.
CPC ..... *E04H 17/1413* (2013.01); *E04H 17/1417* (2013.01); *E04H 17/161* (2013.01);
(Continued)

(58) Field of Classification Search
CPC . E04H 17/14; E04H 17/1417; E04H 17/1456; E04H 17/166; E04H 17/168; E04H 17/26; E04H 17/006
See application file for complete search history.

(56) References Cited

U.S. PATENT DOCUMENTS 4,369,953 A * 1/1983 Greiner ................. E04H 17/143 256/73
5,702,090 A * 12/1997 Edgman .............. E04H 17/1488 256/65.02
(Continued)

FOREIGN PATENT DOCUMENTS

EP 1 156 178 * 11/2001 ............. E04H 17/16
FR 2 741 903 * 12/1995 ............. E04H 17/16
(Continued)

*Primary Examiner* — Michael P Ferguson
(74) *Attorney, Agent, or Firm* — Michael L. Greenberg, Esq.; Greenberg & Lieberman, LLC

(57) ABSTRACT

A privacy and sound barrier fence system and apparatus is disclosed. The fence is erected with interlocking horizontal or vertical panels which are held in place by posts at the ends of the boards. The boards are equipped with a tongue and groove system, configured to enable the boards to interlock, forming a solid wall segment. Each segment, referred to as a module, may be connected at a 90-degree angle, to permit a turn in the fence. Adjustable mounting points on the posts allow for the modules to be disposed in a step orientation or at a slope for non-level terrain. The boards ensure that the erected fence remains aesthetically pleasing from both the front and rear of the fence. A Santa Fe embodiment of the fence system does not employ any structural rain reinforcement connecting the posts and is capable of withstanding hurricane-strength winds.

1 Claim, 19 Drawing Sheets

Related U.S. Application Data application No. 15/694,552, filed on Sep. 1, 2017, now Pat. No. 11,053,707.

(51) Int. Cl.
*E04H 17/20* (2006.01)
*E04H 17/00* (2006.01)
*E06B 11/02* (2006.01)

(52) U.S. Cl.
CPC ........... *E04H 17/168* (2013.01); *E04H 17/20* (2013.01); *E04H 17/006* (2021.01); *E04H 17/1456* (2021.01); *E06B 11/02* (2013.01)

(56) References Cited

U.S. PATENT DOCUMENTS

| | | | | | |
|---|---|---|---|---|---|
| 6,658,753 | B2 * | 12/2003 | Tatarnic | G01C 15/02 33/645 |
| 7,726,037 | B1 * | 6/2010 | Jordan | E04H 17/20 33/613 |
| 10,145,142 | B1 * | 12/2018 | Jansen | E04H 17/16 |
| 11,053,707 | B2 * | 7/2021 | Lebrija | E04H 17/20 |
| 11,253,989 | B1 * | 2/2022 | Bock | E04H 17/26 |
| 2004/0140461 | A1 * | 7/2004 | Lappen | E04H 17/16 256/24 |
| 2017/0058557 | A1 * | 3/2017 | Wu | E04H 17/009 |

FOREIGN PATENT DOCUMENTS

| | | | | |
|---|---|---|---|---|
| FR | 2 958 674 | * | 10/2011 | E04H 17/14 |
| FR | 2 991 346 | * | 12/2013 | E04H 17/00 |
| GB | 2485412 | * | 5/2012 | E04H 17/16 |

* cited by examiner

Sloping Configuration

Variable Height Configuration

SANTA FE GATE

MESA GATE

MODULAR PRIVACY AND SOUND BARRIER FENCE SYSTEM

CONTINUITY

This application is a continuation-in-part application of continuation patent application Ser. No. 17/368,478, filed on Jul. 6, 2021, and of Utility patent application Ser. No. 15/694,552, filed on Sep. 1, 2017, and priority is claimed thereto.

FIELD OF THE PRESENT INVENTION

The present invention relates to outdoor fences, and more specifically relates to a modular solid-wall privacy fence erected with interlocking boards extending between slotted vertical posts.

BACKGROUND OF THE PRESENT INVENTION

Conventionally, privacy fences are erected with boards disposed in a row vertically, and held in place with one or more posts which are anchored to the ground. These fences provide privacy, and as such, the boards are conventionally disposed close to one another, rather than gapped. Fences such as these are commonly used for lawns for homes, as well as delineating property lines. A lack of spacing between each of the vertical boards ensures that individuals cannot see through the fence from either side.

Unfortunately, many conventional privacy fences are not designed to withstand hurricane-force winds. The few fences able to withstand high winds are often difficult to construct, and are costly to install. Additionally, traditional fences employ at least one reinforcing board extending between the posts on which to mount the pickets or boards. This causes the rear of the fence to appears less aesthetically pleasing than the front of the fence, which is conventionally flat with few asymmetrical imperfections. Conventional fences such as these are often difficult for amateurs to construct properly, and require several tools to erect. If there were a fence that could be erected quickly and easily, that is also aesthetically pleasing from both the front and the rear, the end customer would benefit greatly. Additionally, the majority of the fence systems on the market employ conventional wood boards and posts, which require staining, painting, and other upkeep in order to ensure the boards last for several years. If a fence were to be constructed with durable composite boards constructed of eco-friendly, recyclable materials, painting and staining would not be required, and upkeep of the fence would be minimized.

Thus, there is a need for a new fence system configured to be easily erected with minimal tools that is wind resistant and capable of providing privacy to the end customer. Such a fence is preferably modular, and is configured to provide privacy via horizontal or vertical boards, rather than solely vertical picket boards, and requires minimal effort to construct. Such a fence would also preferably employ durable composite boards that are pre-finished, removing the need to paint or stain the fence over time. Additionally, the boards are preferably configured to interlock with one another, further enhancing the strength and stability of the fence system. Such a system preferably has a design which achieves a sound barrier effect.

SUMMARY OF THE PRESENT INVENTION

The present invention is a modular fence system that employs interlocking boards to erect a stable privacy fence.

The interlocking boards may be disposed in the horizontal or vertical position between vertical posts. The present invention is preferably equipped with a unique post design that allows the user to install the product as a one 8 foot section of fencing without the need to purchase a final or a second post, unlike conventional fence systems. Several differing arrangements can be accomplished with the system of the present invention, including a horizontal application, referenced as “Santa Fe,” and a vertical application referenced as “Mesa.” Other arrangements are also envisioned, including a horizontal basket weave, classic privacy orientation, and shadow box orientation.

The design of the posts of the present invention also permits the fence module to be assembled with other modules in order to create a line fence, the post design permits the two posts included on the system to bolt each other back-to-back to create this configuration, it also permits the fence to have a 90-degree direction change by bolting the posts on the side, rather than back to back. The unique design also permits the posts to adjust if the grading of the terrain is not flat. The design permits a unique step adjustment for uneven terrain, wherein the posts, when bolted together, are equipped with at least one adjustment option embodied with a variety of mounting holes. Due to the nature of the interlocking boards, minimal tools and hardware is required to erect the privacy fence of the present invention in a safe, wind-resistant fashion.

Additionally, the design of the present invention achieves a sound barrier effect due to the way in which the slotted posts seal to the hollow boards. Likewise, the hollow boards are made of a composite material, which reduces the noise perceived behind the fencing barrier. As such, the present invention is configured to function as both a sound barrier, as well as a privacy barrier.

Further, the new and improved embodiments of the present invention facilitate installation of the privacy fencing without the requirement of precise measurements of hole depths, post spacings, ground clearance, and vertical clearance, as supplemental features have been added to enable the novice to install the fence rapidly, minimizing the need for substantial measuring through the use of an innovative, pre-established spacing system. This eliminates the need to reinstall fencing components if initial measurements were off, expediting installation, preventing all of the most common mistakes experienced in fencing installations. Further, the improvements have facilitated the reduction of the overall number of components of the system, from an initial 32 components, down to 24 components in a single fencing panel.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
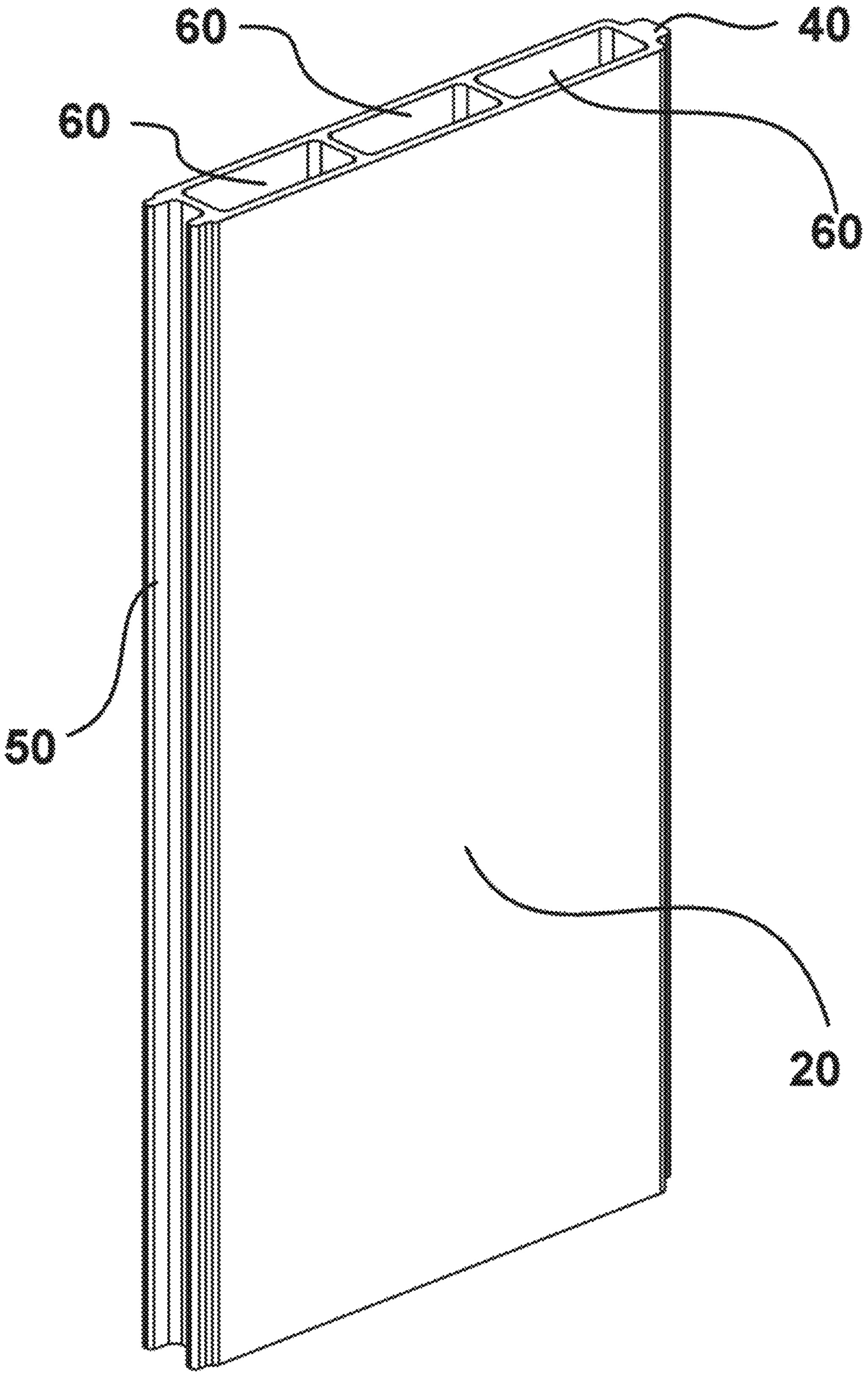
FIG. 1 shows a front view of one of the boards of the present invention, detailing the partially hollow interior of the board.
Figure 2:
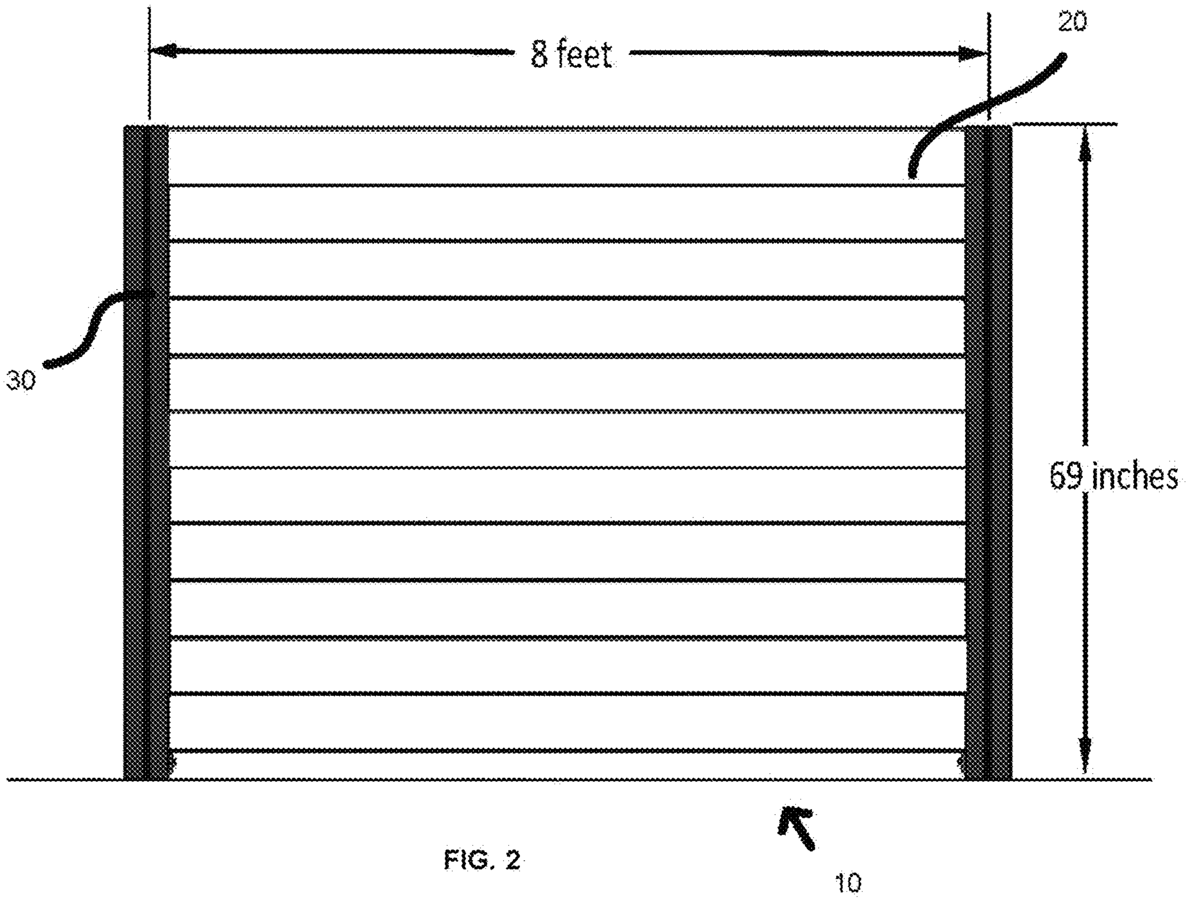
FIG. 2 exhibits a view of the horizontal boards of the present invention arranged in a privacy fence module, detailing the nature by which they interlock together when assembled, and are limited and bound in position via the posts.

The present invention is a modular fence consisting of at least one module (10). Each of the at least one modules (10) includes boards (20) and posts (30). Additionally, each module (10) is preferably six feet tall by eight feet long (or six feet tall by six feet long). The at least one module (10) of the present invention, when properly erected, meets the Miami Dade County wind load requirement, the highest standard in America. As such, the at least one module (10) of the present invention is configured to withstand up to 115 MPH gusts and sustained winds of up to 75 mph.

The modular privacy fence employs posts (30) which exhibit a unique design that enables the user to install the present invention as a singular eight-foot section (a module (10)) without any need to purchase a final or a second post as is the case on all existing systems. The posts (30) are equipped with a channel (80) in which the boards (20) are disposed, bound in position via the channels (80). The channels (80), one disposed in each post (30), act as a guide, providing for the boards (20) to slide down the channels (80), aided by gravity, into position, and interlocked with adjacent boards (20). The channels (80) of the present invention are preferably 'U-shaped.'

Figure 3:
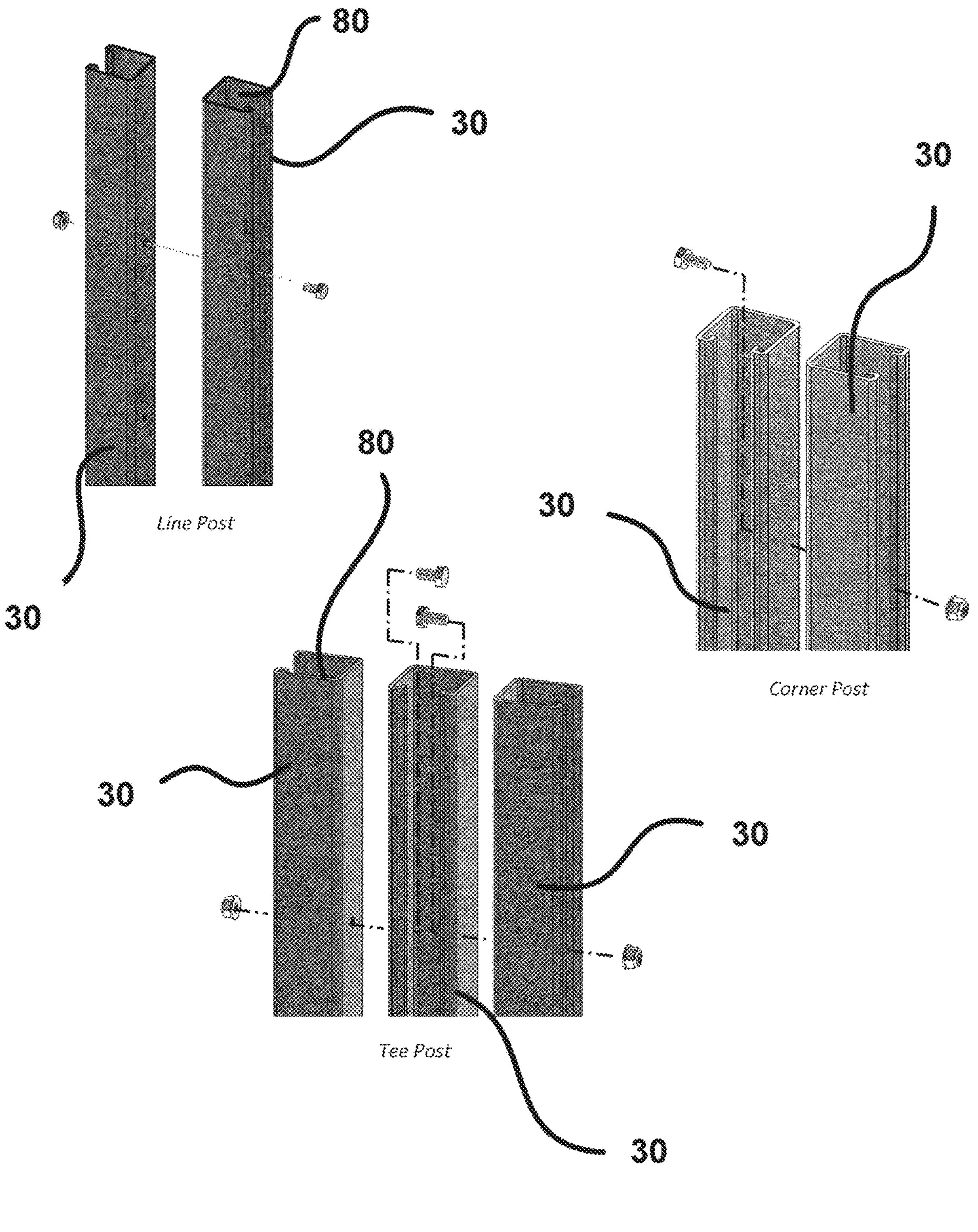
FIG. 3 displays a view of the three post configurations configured to enable a line fence, 90 degree turn in a fence, and a T-shaped arrangement.
Figure 4:
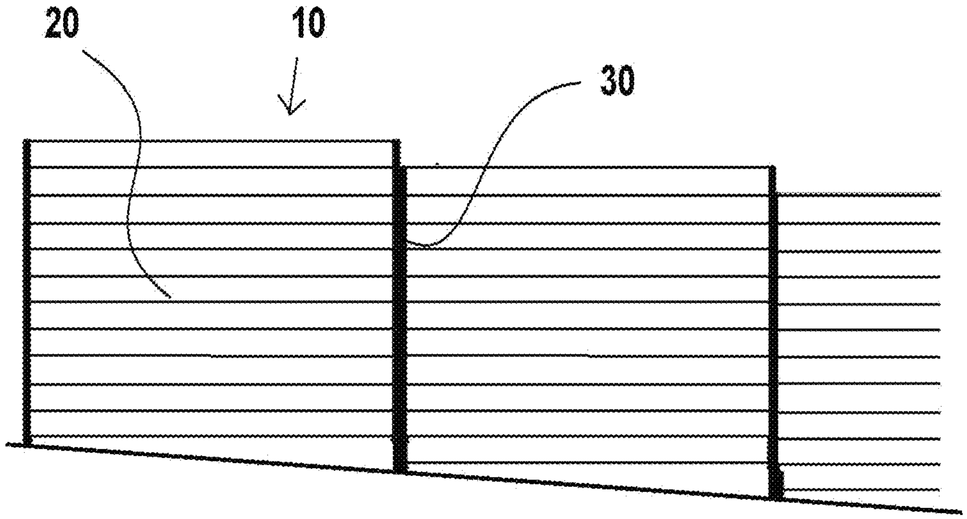
FIG. 4 shows embodiments of the present invention disposed on an incline, as well as in a step configuration.
Figure 4:
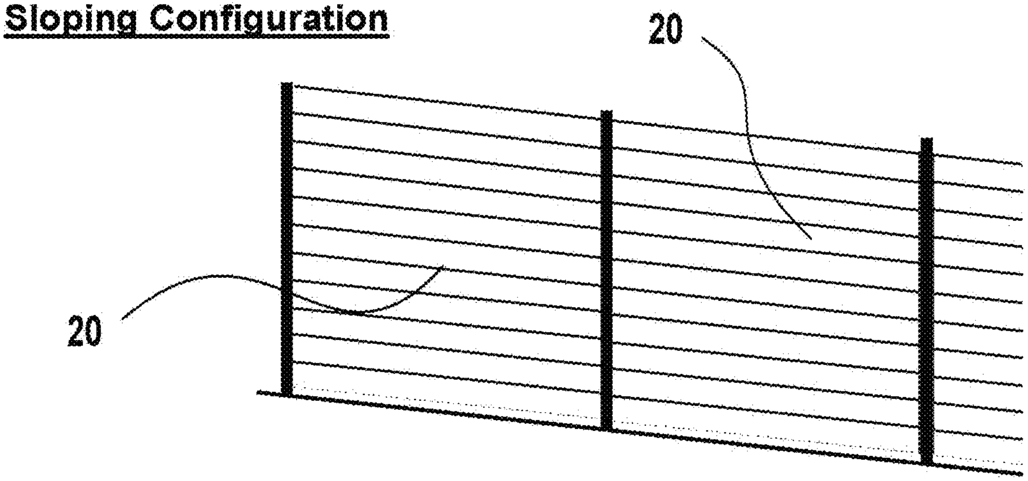
Figure 4:
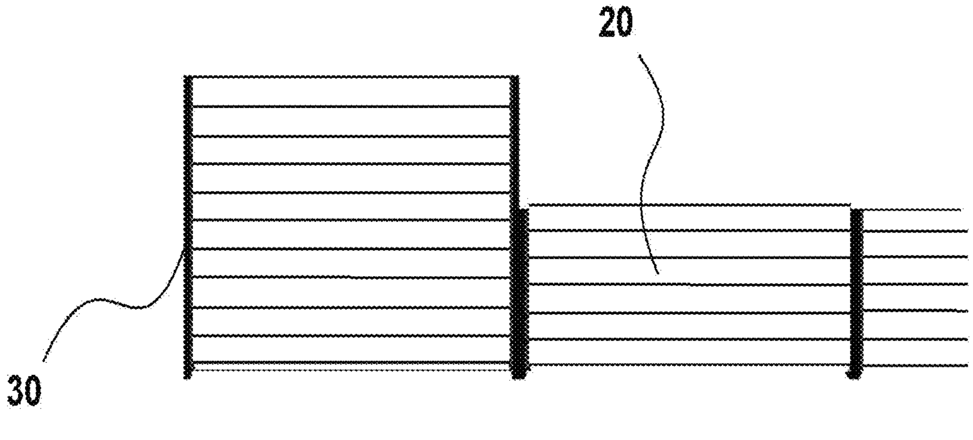

The posts (30) also permit the at least one module (10) to be assembled with other modules (10) in order to create a line fence. The post design enables the posts (30) to be oriented in one of two ways, two posts oriented rear-to-rear, or two posts oriented rear-to-side. The rear-to-side configuration, as shown in FIG. 3, facilitates a 90 degree turn in the line of the privacy fence. The unique design also permits the posts to adjust if the grading of the terrain is not level, as shown in FIG. 4. The design permits a unique step adjustment where the posts when bolted against each other have an adjustment option. The difference with other systems is that with the design of the present invention, the fence boards will always be installed all the way to the top of the post, making the product perform and look good. Additionally, the posts (30) of the present invention are preferably powder-coated steel, helping to ensure a highly durable privacy fence that is aesthetically pleasing.

The boards (20) of the present invention are preferably conventional composite boards constructed of recycled materials. The boards (20) are preferably equipped with at least one cavity (60), making the boards (20) partially hollow. The design of the boards (20) permits a light design, ensuring that the boards (20) remain structurally sound to hold the pressure of the wind without issue. Conversely, if the boards were to be solid, the boards (20) would have a greater weight, and would not be as structurally sound. The design of the posts (30) and the boards (20) ensures that a conventional reinforcement board is not needed. Additionally, the boards (20) of the fence module (10) are preferably equipped with a tongue (40) and a groove (50), which are configured to interlock when stacked in all embodiments of the present invention. In this manner, the boards fit securely together, and require no fasteners. It is envisioned that the boards (20) of the present invention are preferably available in a variety of colors and patterns, including, but not limited to, timber brown, rosewood, raven, and charcoal gray.

A bottom rail (45) is disposed along the ground, at the base of the present invention, and extends between posts (30) of each segment (10), aiding the strength of the fencing. The bottom rail (45) also provides for easy adjustment of the overall height of the boards, and helps to facilitate leveling of the top of the fence to the top of the posts (30). In some embodiments of the present invention, a top rail (55) is configured to sit atop the boards (20) when disposed between the post, the finalize installation, and ensure the boards (20) remain in position. Alternately, in the preferred embodiment of the present invention, a post cable spacer (310) is present in lieu of the bottom rail (45), configured to help support the boards (20). The post cable spacer (310) is equipped with a post cable grip (320), disposed centrally along the cable, that is configured to cup around the bottom-most board (20) of the fence.

When constructed, the design permits a self-aligning mechanism that gives two primary benefits: the first benefit is that the boards (20), once installed on the posts (30) and interlocked together via the tongues (40) and grooves (50), become a one structural, unit causing the product to be strong and flexible. The second is the aesthetics; the tongue and groove system secures the position of the fence boards horizontally, ensuring that the fence remains pleasing to the eye from both the front and rear of the fence. The posts (30) remove the need for a traditional reinforcement board(s) to provide stability to the fence. Namely, the nature of the present invention ensures that both the rear and the front of the at least one module (10) appear identical.

The present invention provides the only system on the market that includes a full eight foot (or six foot) privacy fence panel, the at least one module (10), in one box. All components of the at least one module (10) are ideally bundled together for installation, which preferably include 11 boards (20), two modular posts (30), and all necessary hardware, such as screws. Additional modules can be purchased in bundles or, if needed, replacement boards (20) may be purchased separately. The posts (30) are preferably made of low-carbon strip steel, and may be colored and/or powder coated to the taste of the consumer.

The at least one module (10) of the present invention may be erected to facilitate the placement of the fence on an incline. As seen in FIG. 4, the posts are equipped with a variety of mounting holes (70), which act as a placement point to link a post (30) from a first module (10) to a second post (30) of a second module (10).

Additionally, at least one end cap (90) is preferably included with each of the at least one module (10) of the present invention. The at least one end cap (90) is configured to be affixed to the top of the posts (30) to provide a pleasing aesthetic appearance to the present invention when construction is completed. The end cap (90) additionally functions to ensure that the boards (20) remain in the preferred position, and may not be easily removed. The end cap (90) is configured to slide into position on the top of a post (30) by sliding into a recessed slot (95) within the channel (80) of the post (30).

Figure 5:
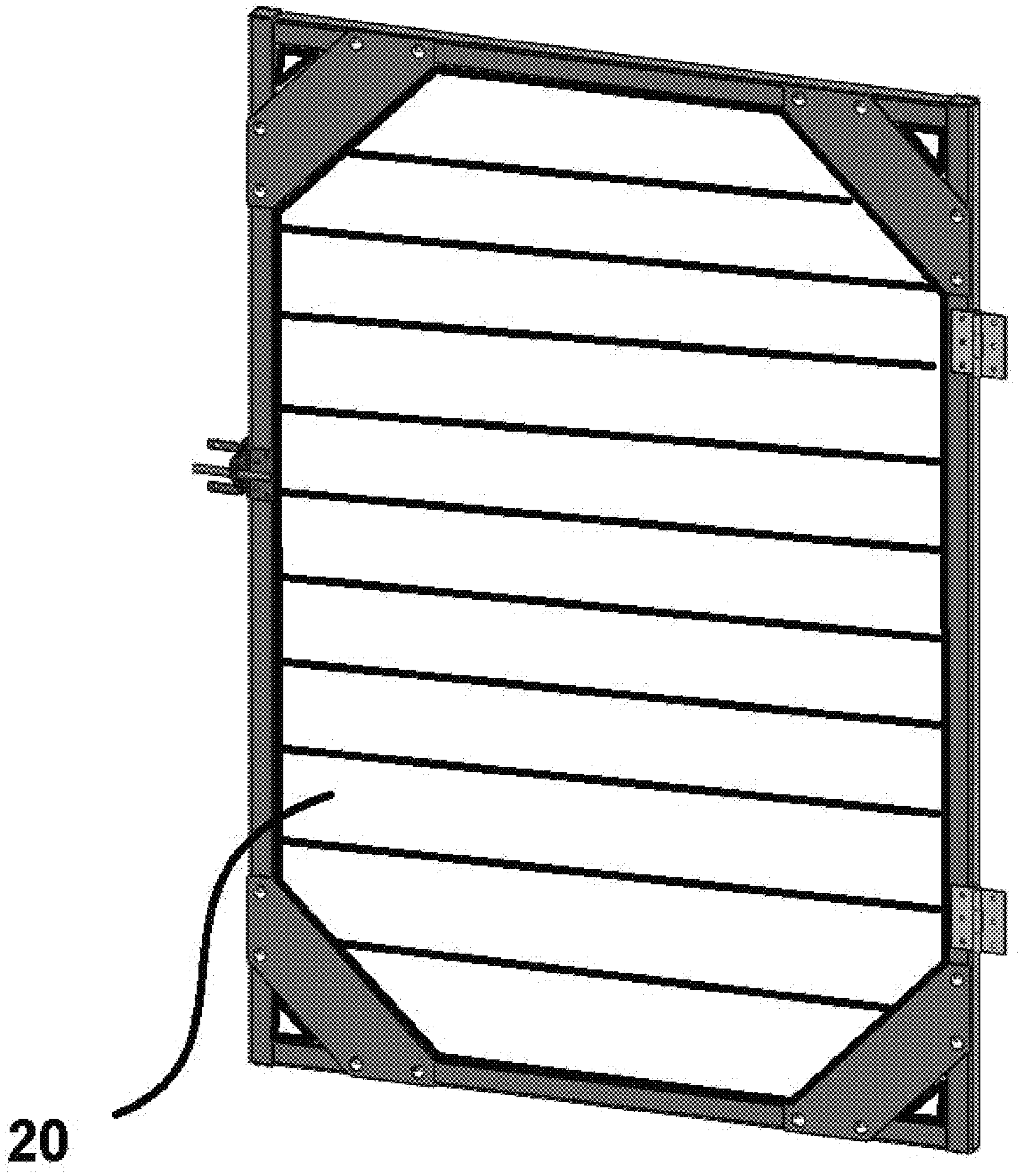
FIG. 5 details a gate which may be erected to accompany the privacy fence of the present invention, fashioned of the same horizontal boards as the at least one module of the present invention.
Figure 6A:
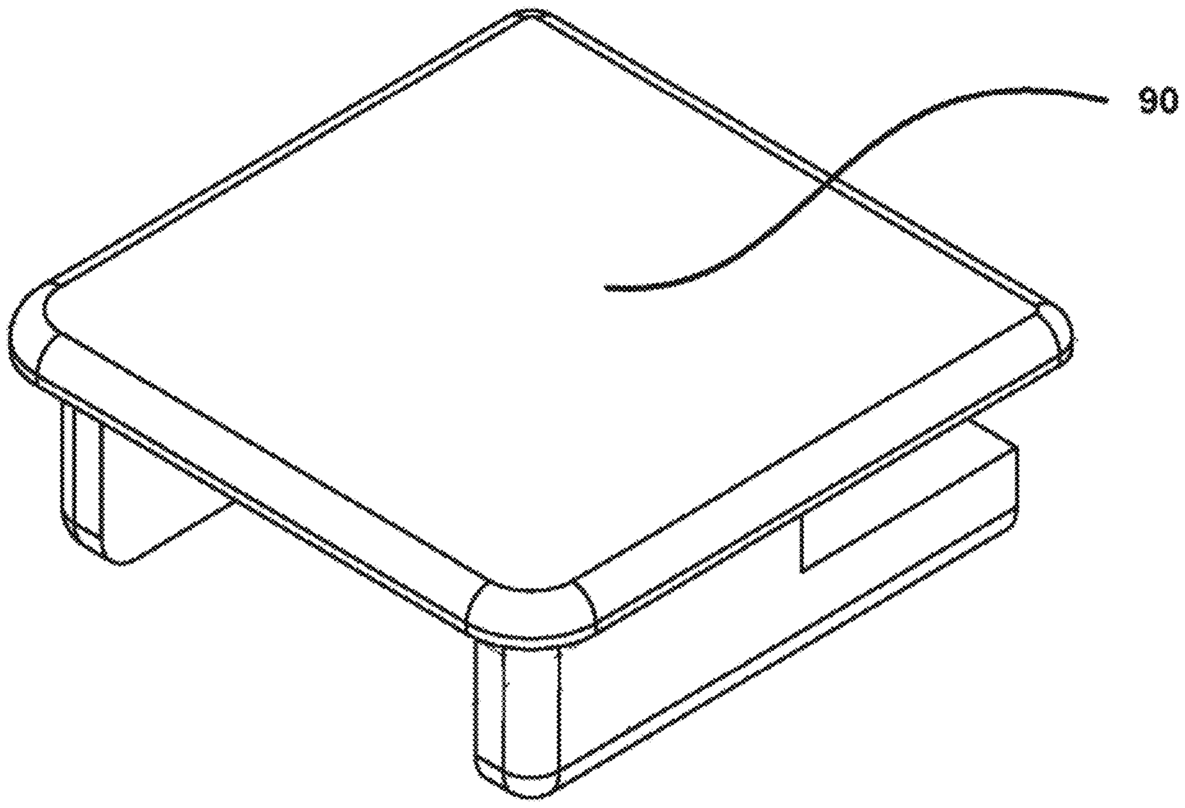
FIG. 6A exhibits a first embodiment of the end cap of the present invention to be disposed atop each post.
Figure 6B:
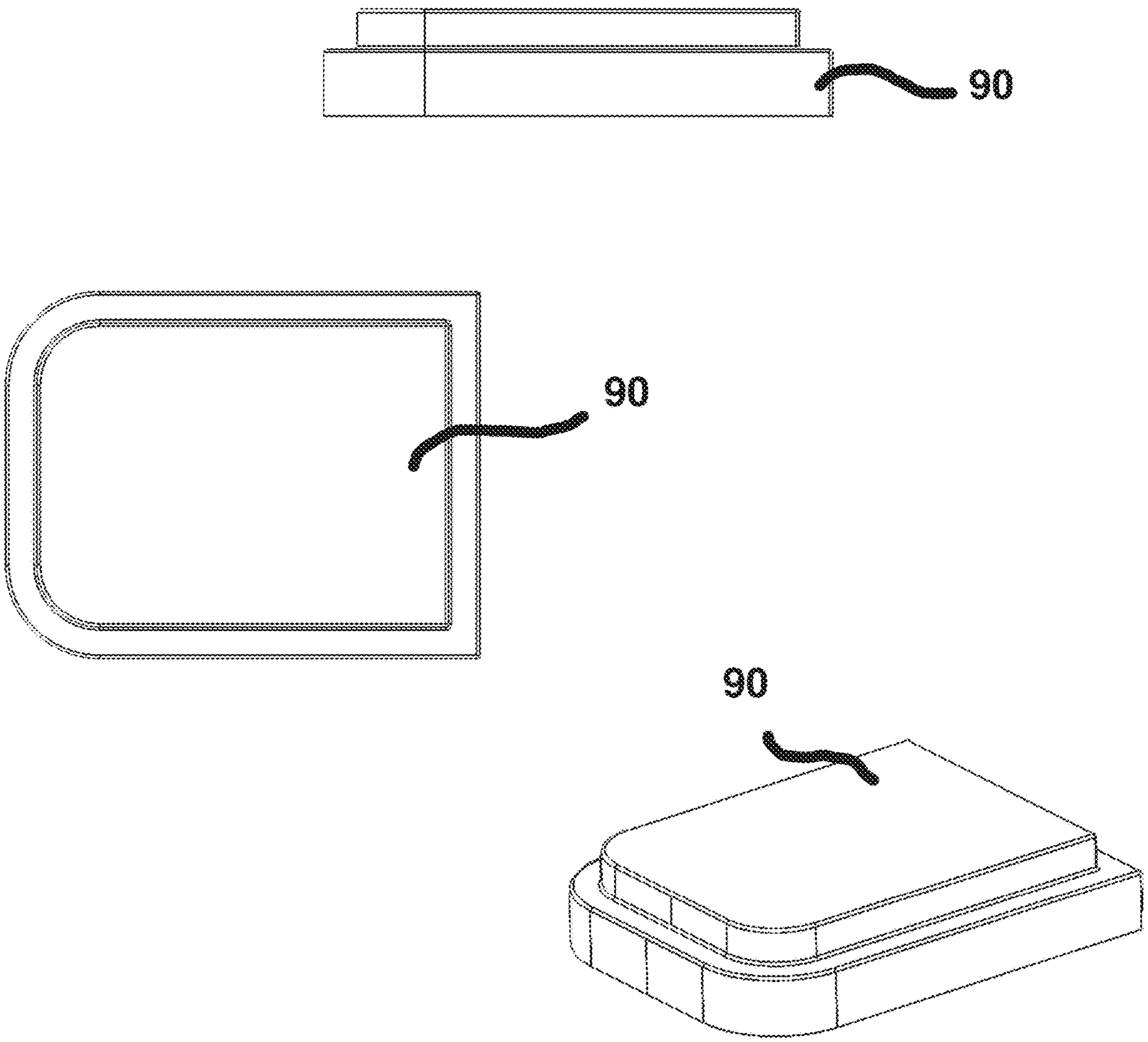
FIG. 6B exhibits views of the preferred embodiment of the end cap of the present invention, configured to slide into the top of each post of the present invention.
Figure 9A:
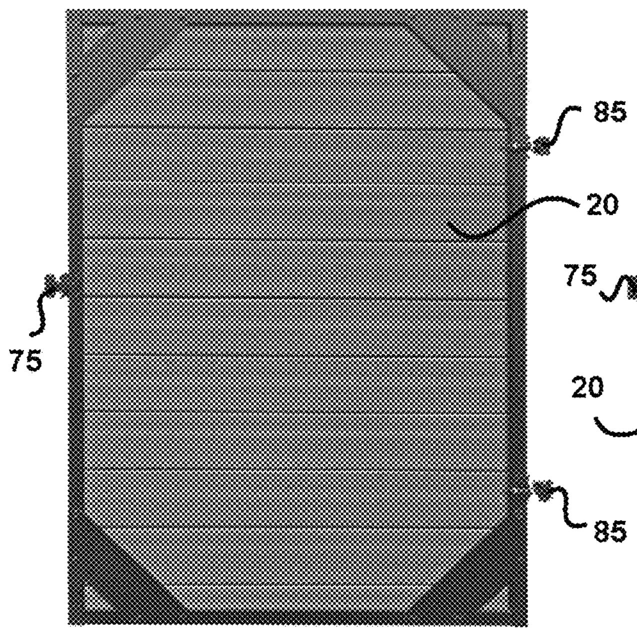
FIG. 9A shows a view of the Santa Fe embodiment of the present invention, depicting the gate.
Figure 9B:
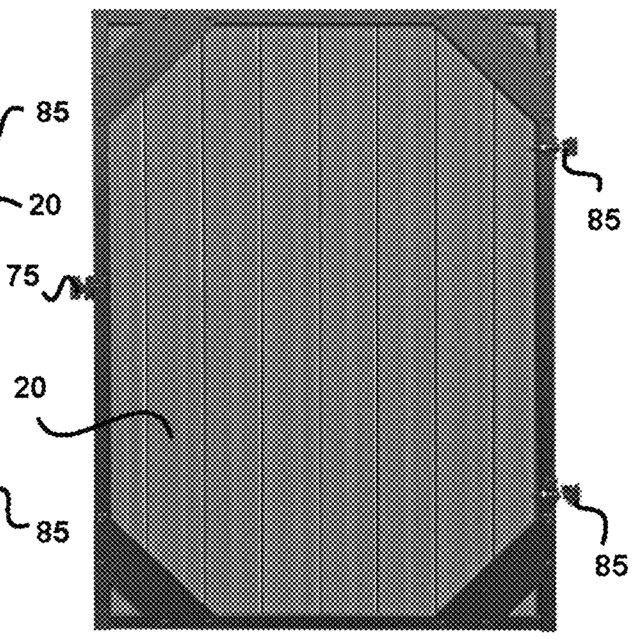
FIG. 9B shows a view of the Mesa embodiment of the present invention, depicting the gate.

Additionally, it should be understood that the boards (20) may be employed to erect a gate, as disclosed in FIG. 5, FIG. 9A, and FIG. 9B. Such a gate preferably employs similar boarders as posts (30) that are also equipped with a channel (80) to guide, hold, and maintain the boards (20) in position on the gate. Hinges (85), as well as a latch (75) are preferably included within the purchase of the pre-constructed gate, in either the Santa Fe embodiment or the mesa embodiment of the present invention.

Figure 7:
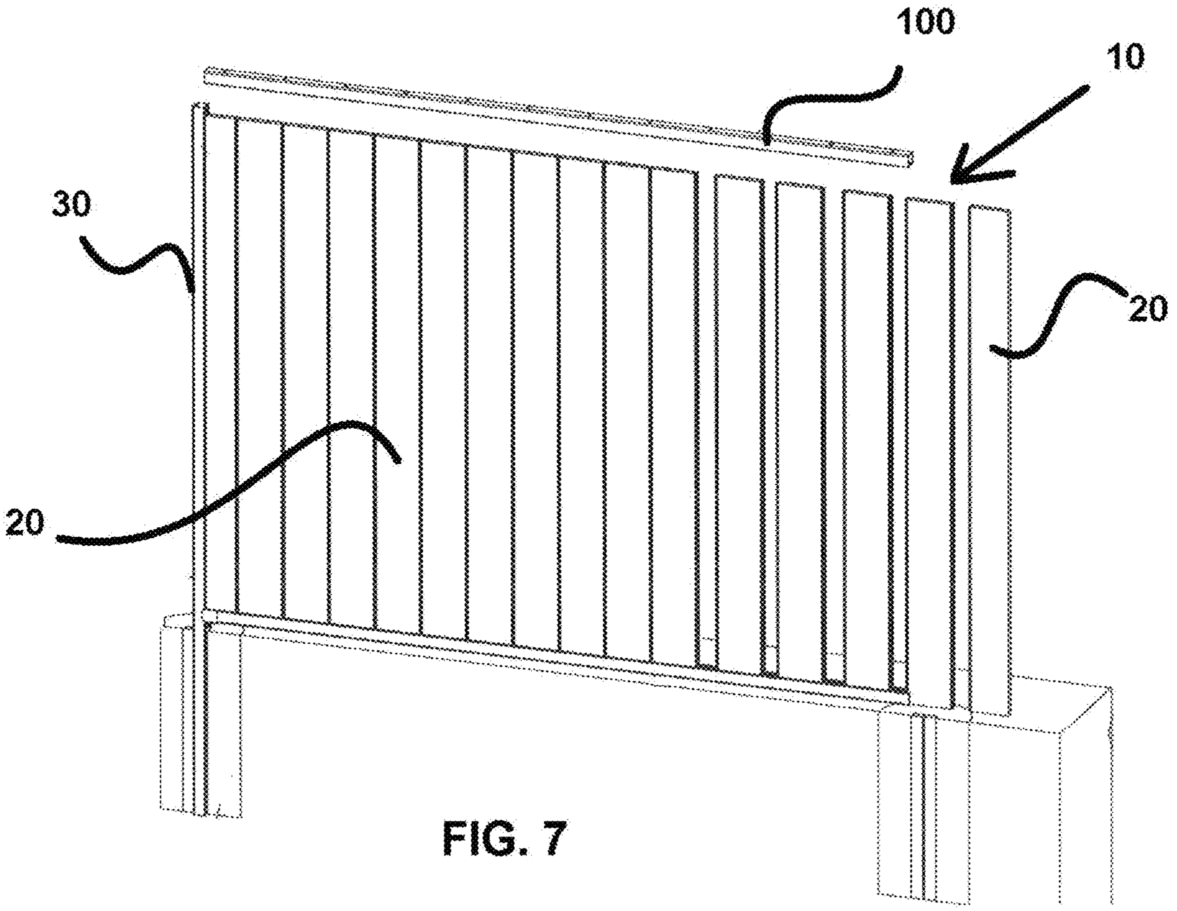
FIG. 7 exhibits a view of the vertical embodiment of the present invention, detailing the vertical boards of the present invention arranged in a privacy fence module.
Figure 8:
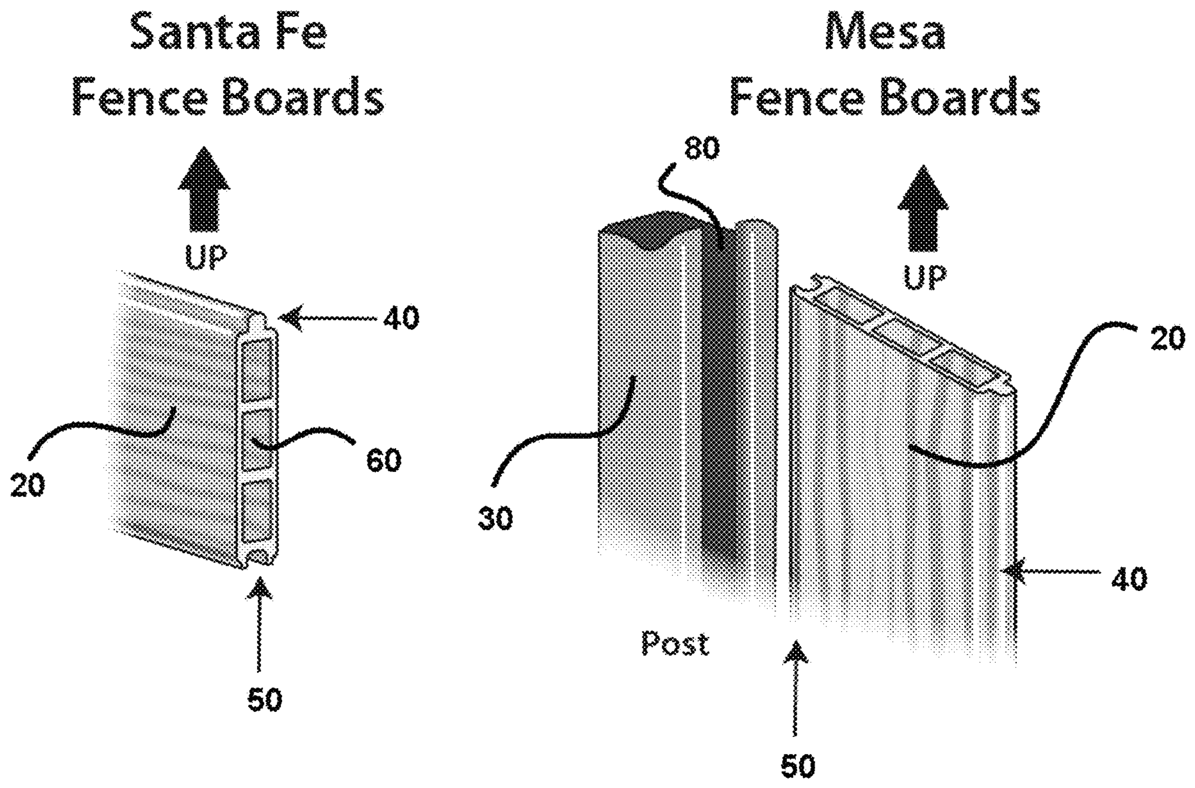
FIG. 8 shows a close-up view of the fence boards of the present invention, including the tongue and groove of each board, as well as the designed orientation for placement within the posts.

Vertical embodiments (referenced as the Mesa fence embodiment) of the present invention, such as those depicted in FIG. 7, preferably employ the same interlocking boards (20) of the horizontal embodiments of the present invention. The boards are securely held together due in part to the tongue and grooves of the boards (20), as well as from the posts (30), which are similarly equipped with a channel (80) to ensure the boards (20) remain in position even under stresses of high winds. In the vertical embodiment depicted in FIG. 7, the present invention is equipped with a top post (100), which is configured to be secured atop the entirety of the vertical boards (20), providing additional strength and coherence to each module (10). The top post (100) is preferably equipped with a groove at a bottom of the top post (100), which is configured to accept the top portion of the vertical boards (20) of the module (10).

Supplemental features of the system and method of the present invention include an assortment of tangible concepts that make installation easier, faster, and more accurate. For example, preferred embodiments of the present invention are bundled with a board stop (300), a post cable spacer (310), a post cable grip (320), a post cable pin (330), and a post depth stick (340). Many of these supplemental features reduce the overall cost of purchase and installation of the fence systems of the present invention by substituting metal posts with composite posts, and by substituting the bottom and top rails with flexible cable rails. As will be detailed below, these features enable the entirety of each post assembly to have all components pre-assembled from the factory, expediting installation and easing logistic challenges for shipment. Each of the aforementioned features are designed for a specific purpose facilitating the installation such that the system of the present invention may be erected by an amateur, non-professional, and/or "Do-it-yourself" (DIY) craftsman.

The following elements are critical to a successful fence installation:

A) Spacing between posts (30). This is a critical step when installing the posts for a fence.
  - Precise spacing is required when installing posts (30), commonly spacing is determined by the type of wall to be installed, most of the spacing is between 6 to 8 feet between posts (30).
  - Traditionally the spacing is marked on the ground by using a tape measure. After holes are made, posts (30) are buried on the ground and a tape measure is used to place the posts (30) in the correct position. This manual procedure requires measuring skills, posts can move before the cement is dry, so the measuring has to occur several times during this process.
  - When posts (30) are not in the precise position there are many problems that can occur, some include:
    - Fence can be unstable
    - Fence will look uneven and present a bad appearance
    - Pickets or boards (20) will not fit the intended space and will have to be cut or will not fit at all, if this occurs extra material will be required.
    - Time required to complete the fence build will increase.
    - When rework is required, the overall cost of the installation will increase.

SOLUTION FOR PROPER SPACING BETWEEN POSTS (30)—The post cable spacer (310) of the present invention consists of a cable that connects both posts (30), the cable exhibiting the exact length required between the posts to achieve optimal alignment. The post cable spacer (310) comes assembled from the factory to the 2-post system of the present invention. Post cable pins (330) are used to connect the post cable spacer (310) to each post (30). The post cable grip(s) (320) are disposed along the post cable spacer (310) and are configured to connect to the first board (20) (bottom board) and ensure that the boards remain in a centered position during installation.

The post cable spacer (310) accomplishes 2 functions:

1. Provides the critical distance required between posts (30).
   - The interior boards (20) and pickets require a precise distance to be assembled correctly.
   - When the posts (30) are extended and the cable is tensed, the exact distance is achieved.
   - With this system, the person setting the posts (30) on the ground can check visually if the distance is correct.
   - No measuring devices are required when using this system.
   - When the posts are on the ground and before the cement is cured, the installer can verify the correct spacing between posts by making sure the cable is tense.

2. A second function of the post cable spacer (310) is to provide support to the privacy elements (wall) that are connected to the post system. All fences require support to keep the privacy wall in place over time.

The flexible steel cable of the post cable spacer (310) of the present invention is very thin, and it is placed on the bottom of the fence.

The post cable spacer (310) is almost invisible.

The completed fence looks much cleaner and better compared with a fence with a normal support element.

B). Post Depth on the ground. This is also critical when installing the posts (30) for a fence.

Posts (30) must be buried to a precise distance in the ground in order to achieve a correct function and aesthetics.

In common post installations, the installer must use a tape measure to achieve the correct distance from the ground to the desired length of the post (30).

This method commonly results in uneven post installations.

After the cement is cured if a mistake is noticed, repair becomes very difficult.

A common practice is to leave the posts (30) long, that way the can be cut to size once the posts (30) are cured and set.

This practice takes a lot of work and time.

It can cost a lot of money to do it this way.

SOLUTION FOR PROPER POST DEPTH—the post depth stick (340) of the present invention. When the post is being set on the ground, the post depth stick (340) provides a visual to the installer to know the correct depth of the post.

1. When the post depth stick (340) touches the ground, then the post has reached the correct distance. The post depth stick (340) provides two inches clearance from the ground to the first board.

C). Ground Clearance. Correct clearance is essential to the proper appearance and function of a completed fence.

Clearance should be 2 inches from ground level to the first board (20) or picket.

This clearance permits water to flow.

Required for airflow that helps with grass or plants.

Required so the first board (20) or picket is not in the ground.

Aesthetically, is important to have the same clearance when a line of fence is installed.

Figure 14:
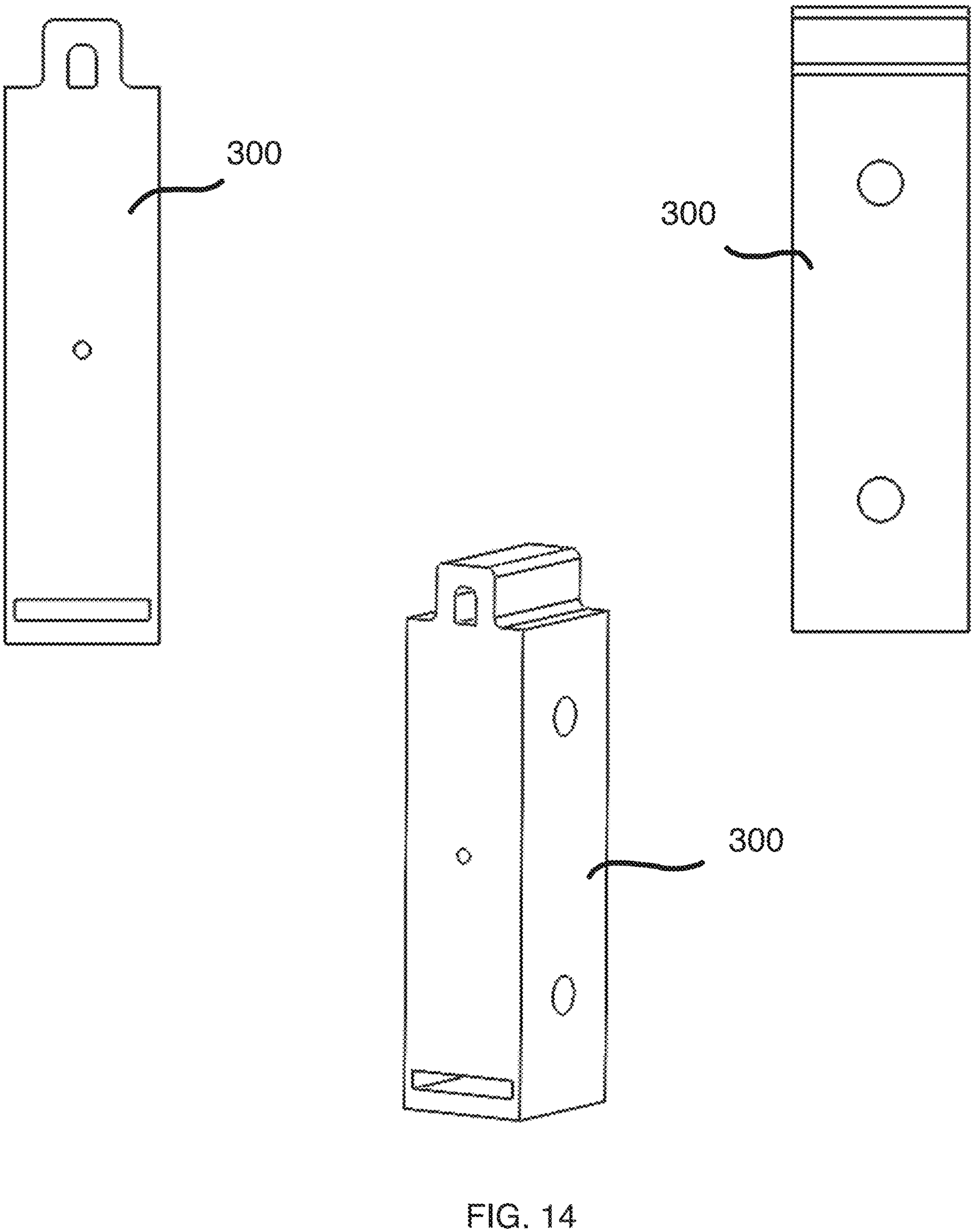
FIG. 14 shows the board stop of the post of the present invention, isolated, from the front and side.
Figure 15:
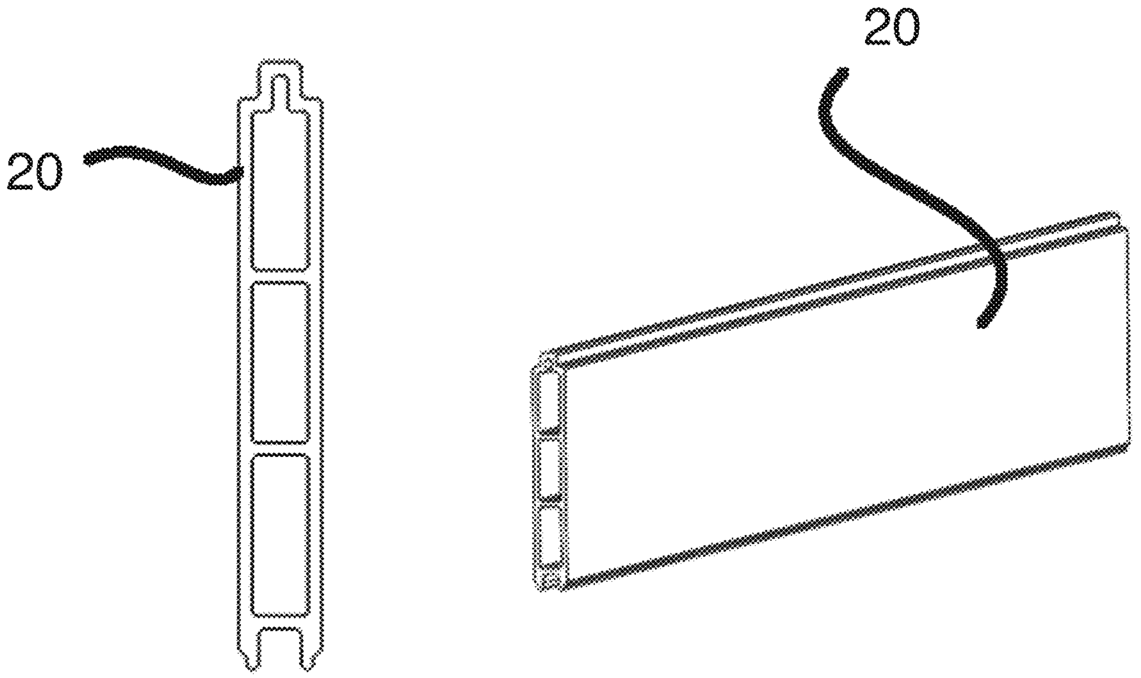
FIG. 15 shows side and profile views of the boards of the present invention.
Figure 16:
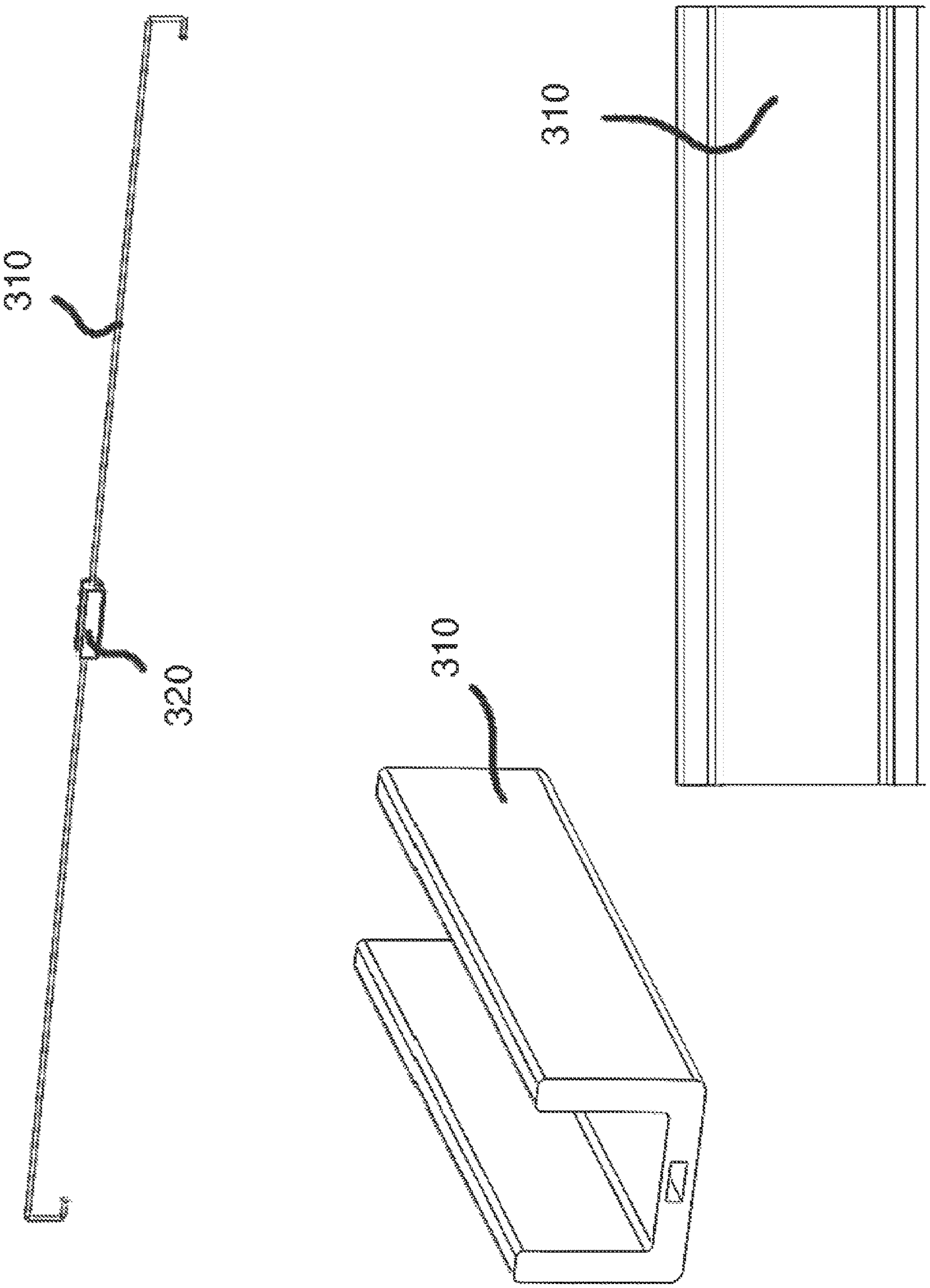
FIG. 16 shows the post cable spacer of the present invention isolated as seen from the front and side.
Figure 17:
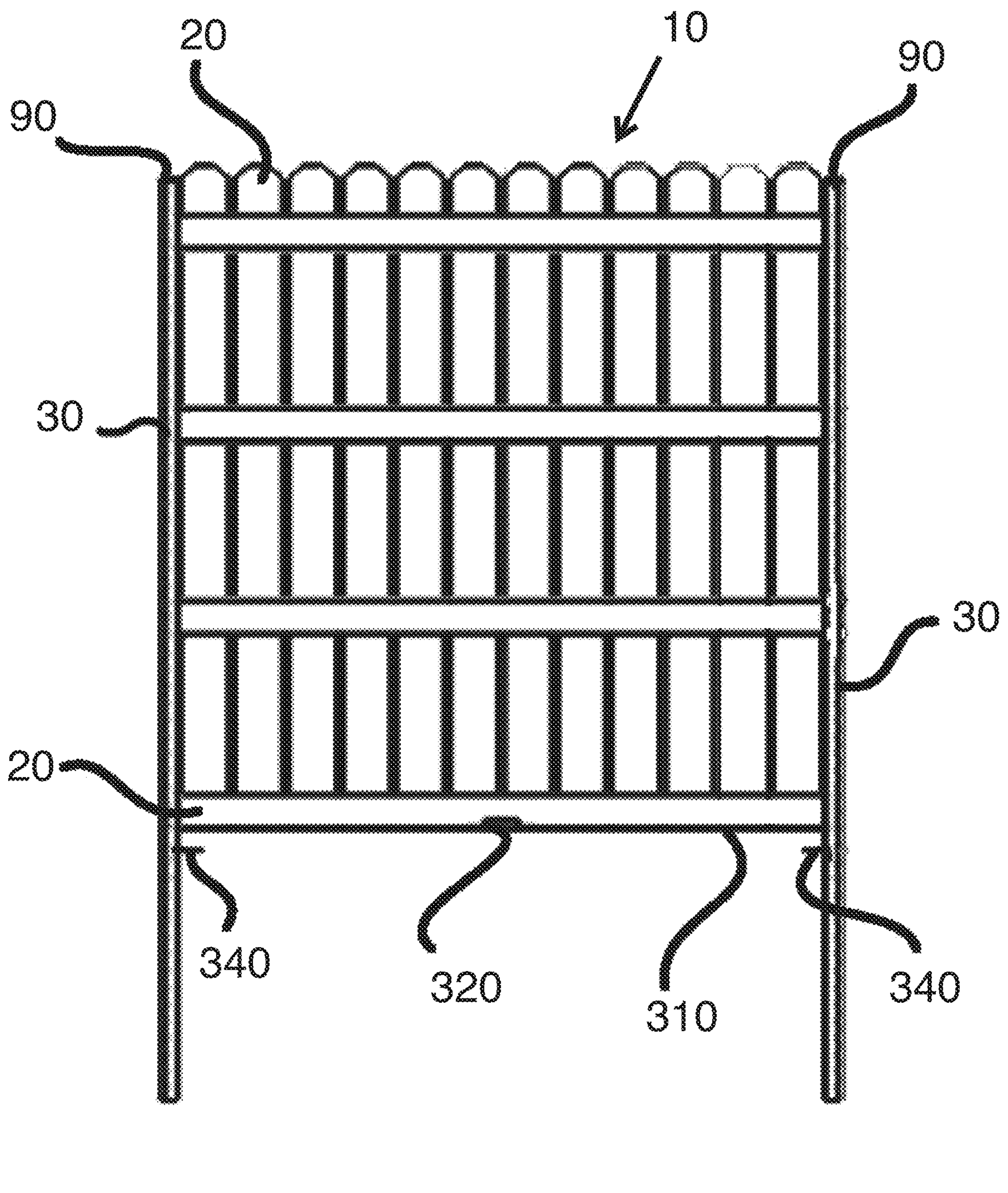
FIG. 17 shows a horizontal picket arrangement, shown with installation completed, as erected via the system and process of the present invention from the rear as a classic privacy configuration, showing flat pickets that can be used with the system of the present invention.

SOLUTION FOR GROUND CLEARANCE—the board stop (300) of the present invention. The board stop (300) is integrated into the post (shown isolated from post in FIG. 14), and is positioned at the precise distance to permit the first board to rest exactly at 2 inches above ground clearance. Common practices call for the installer to manually fix the boards or rails two inches above ground level. This common method can create a lot of problems and requires measuring and carpenter skills. Advantages to the board stop (300) of the present invention include:

Permits the boards (20) or rails to rest at the precise clearance required.

It gives stability to the system.

Clearance should be 2 inches from ground level to the first board or picket.

Clearance is important because:

permits water to flow under the fence.

Adequate airflow helps with grass or plant growth.

First board (20) or picket is not in contact with the ground, preventing premature deterioration.

Aesthetically is important to have the same clearance when a line of fence is installed D). Vertical clearance from first board to last board & end cap is critical to proper installation of the fence system of the present invention.

The first board should be 2 inches over the ground, and the last should be close to 6 feet above the ground. (This exact distance is determined by the fence system selected)

Privacy fences are commonly 6 feet high.

Figure 10:
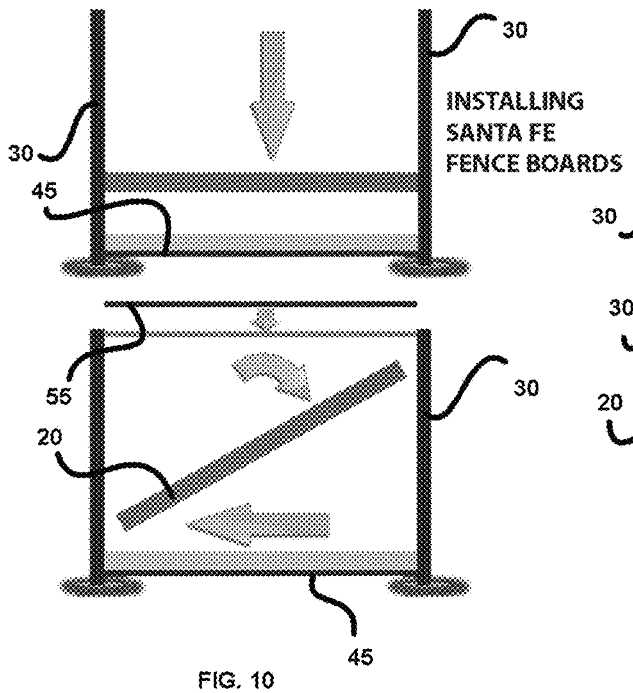
FIG. 10 displays a view of the front of the Santa Fe embodiment of the present invention, detailing the installation of the horizontal boards.
Figure 11:
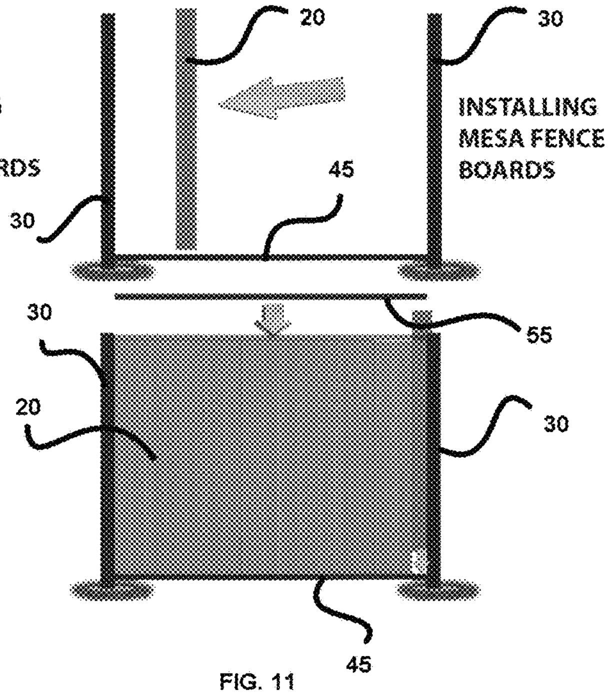
FIG. 11 depicts a view of the front of the Mesa embodiment of the present invention, detailing the installation of the vertical boards.
Figure 12:
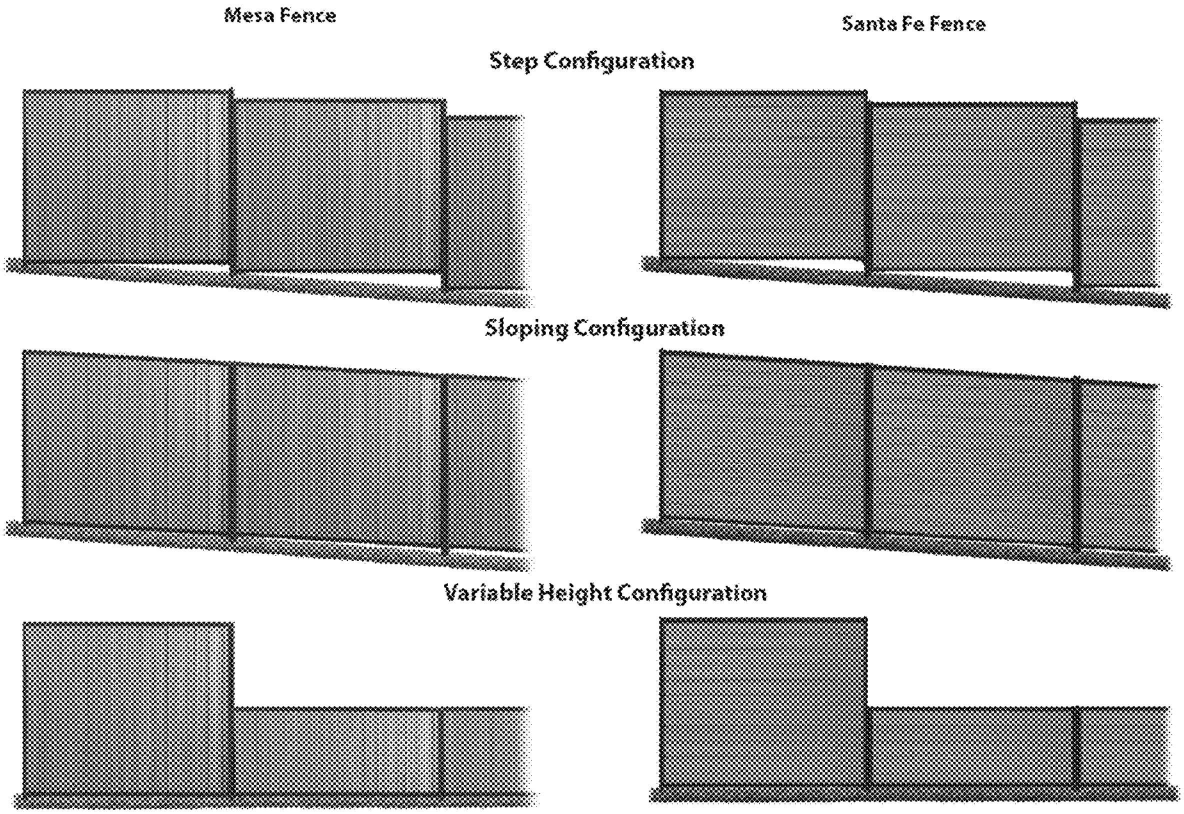
FIG. 12 shows each configuration of the present invention, including a step configuration, a sloping configuration, and a variable height configuration, shown in both the first embodiment and second embodiment of the present invention.

The last board should fit precisely on the post. (as shown in FIG. 10 and FIG. 11.

If the last board is short, the fence will look bad and uneven.

Common practices call for cutting and adjusting the high of the post.

This practice is costly and difficult for a nonprofessional.

If the last board overpasses the post, then the fence will have to be adjusted

When this occurs, the fence will have to be re-installed.

Further, the newly improved embodiments of the present invention, exhibiting fewer components the prior embodiments, permit the use of steel posts as well as composite posts. The new composite posts are sustainable and 'green,' and do not require painting or maintenance. Further, they are less expensive and look better by matching the boards or pickets of the present invention. Additionally, the new embodiments permit the use of flat pickets instead of hollow ton-and-groove boards if desired. Three differing styles, as previously described, may be created with flat 3.5 inch and 5-inch flat traditional pickets using these post improvements. In such embodiments, the dimensions of the U-Shaped posts may differ to accommodate the differently sized pickets to facilitate the creation of a horizontal basket weave fence, classic privacy fence with vertical pickets, and a shadow box embodiment.

Figure 13A:
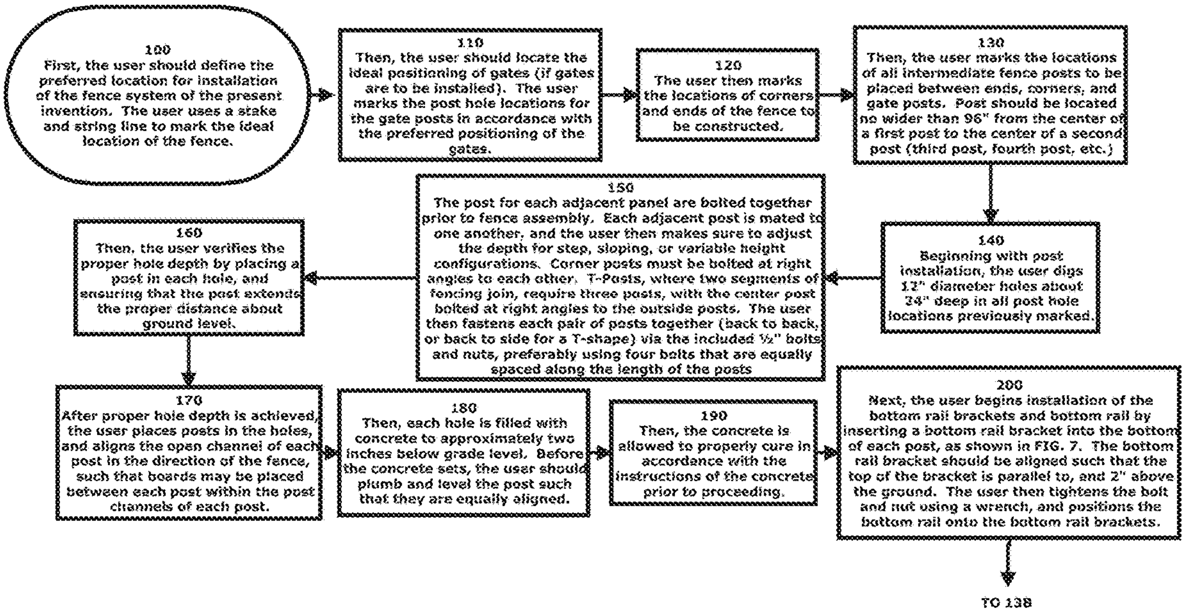
FIG. 13A shows a first portion of a flow chart of the process of installation of the present invention.
Figure 13B:
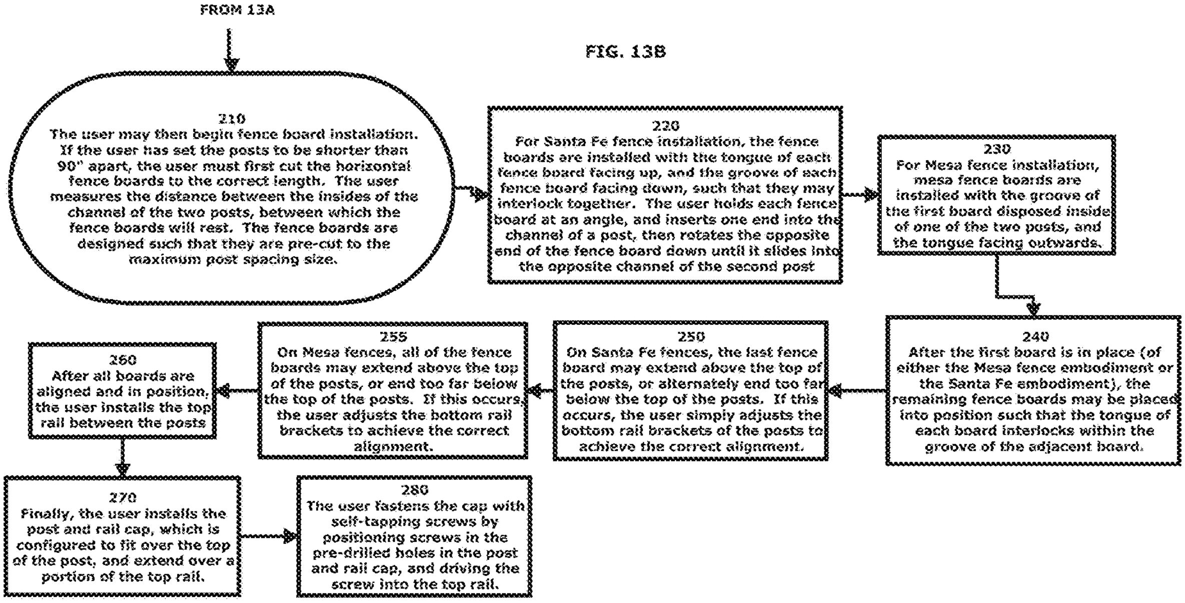
FIG. 13B depicts a second portion of the flow chart of the process of installation of the present invention.

Installation of the present invention, as depicted in FIG. 13A and FIG. 13B, is preferably enacted as follows:

1. Before beginning, the user is encouraged to confirm the location of underground utilities before digging via a utility company location service. Additionally, it is recommended to locate official property lines, to ensure that the present invention is installed in the correct location. Similarly, the user should obtain any and all necessary permits as required by local building codes, zoning laws, and regulations.
2. The user acquires the requisite tools for installation, including stakes, string line, a tape measure, spray paint (if desired), a level, a miter saw, a wheel barrow, a post hole digger, a shovel, a wrench/socket, and a drill equipped with a 3/16" nut driver bit.
3. First, the user should define the preferred location for installation of the fence system of the present invention. The user uses a stake and string line to mark the ideal location of the fence. (100) It is recommended that the user locate the fence three to five inches inside of the property line to prevent encroachment onto a neighbor's property.
4. Then, the user should locate the ideal positioning of gates (if gates are to be installed). The user marks the post hole locations for the gate posts in accordance with the preferred positioning of the gates. (110)
5. The user then marks the locations of corners and ends of the fence to be constructed. (120)
6. Then, the user marks the locations of all intermediate fence posts to be placed between ends, corners, and gate posts. Post should be located no wider than 96"

from the center of a first post to the center of a second post (third post, fourth post, etc.) (130) In new embodiments, this step is not-needed, as the guide line is present to ensure proper spacing between posts, eliminating the need for measurements.

Figure 18:
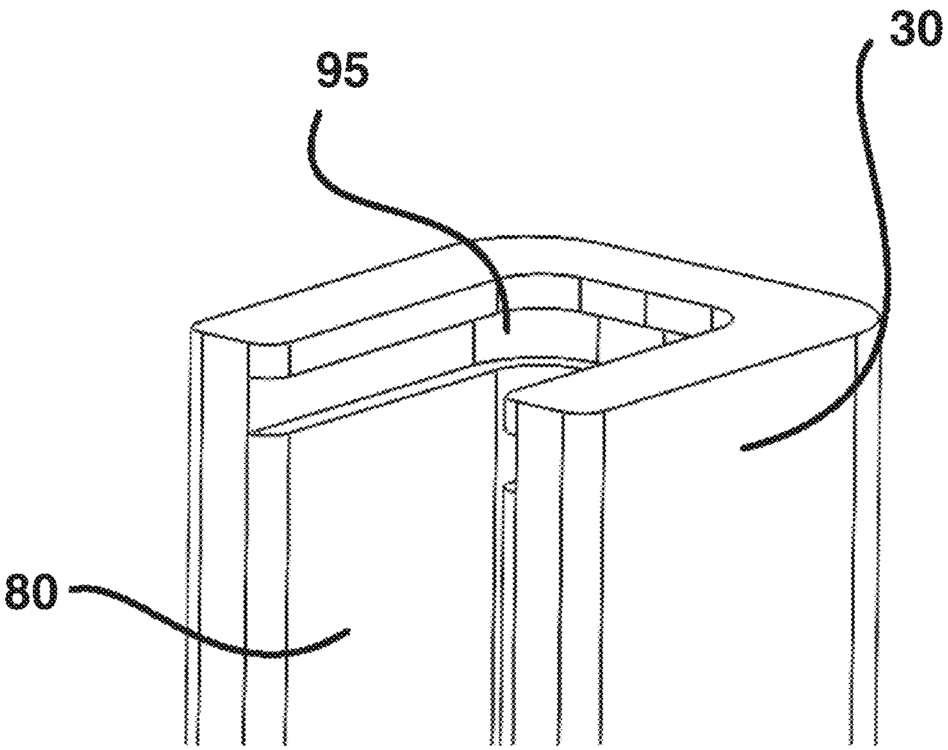
FIG. 18 shows a close-up view of the top of a post, detailing the channel and recessed slot configured to accept the preferred embodiment of the top cap of the present invention.

7. It should be noted that, when laying out the initial post locations, the user may end up with a non-uniform section at the end of the fencing structure. To prevent this, and to create a uniform fence, the user should space all panel sections at equal lengths with use of the post cable (310) spacer.
8. Beginning with post installation, the user digs 12" diameter holes about 24" deep in all post hole locations previously marked. The post depth stick is employed to ensure adequate depth without measuring (140). The post cable spacer (310) is employed to ensure the correct spacing between posts.
9. Each eight-foot (or six-foot) panel of both embodiments of the fence system of the present invention requires a post at each end. The post for each adjacent panel are bolted together prior to fence assembly. Each adjacent post is mated to one another, and the user then makes sure to adjust the depth for step, sloping, or variable height configurations. Corner posts must be bolted at right angles to each other. T-Posts, where two segments of fencing join, require three posts, with the center post bolted at right angles to the outside posts. The user then fastens each pair of posts together (back to back, or back to side for a T-shape) via the included ½" bolts and nuts, preferably using four bolts that are equally spaced along the length of the posts. (150). In preferred embodiments, the hardware is pre-installed in the respective components, minimizing installation time.
10. Then, the user verifies the proper hole depth by placing a post in each hole, and ensuring that the post extends the proper distance about ground level. The post depth stick is employed to verify hole depth. (160) It may be necessary to add or remove additional dirt from the holes to obtain the proper desired height.
11. After proper hole depth is achieved, the user places posts in the holes, and aligns the open channel of each post in the direction of the fence, such that boards may be placed between each post within the post channels of each post. The post cable spacer (310) is used to ensure the posts are at the precise distance from one another. (170)
12. Then, each hole is filled with concrete to approximately two inches below grade level. Before the concrete sets, the user should plumb and level the post such that they are equally aligned. (180)
13. Then, the concrete is allowed to properly cure in accordance with the instructions of the concrete prior to proceeding. (190)
14. Next, (when needed) the user begins installation of the bottom rail brackets and bottom rail by inserting a bottom rail bracket into the bottom of each post, as shown in FIG. 7. The bottom rail bracket should be aligned such that the top of the bracket is parallel to, and 2" above the ground, which is facilitated via the board stop present within the U-shape of each post. (200) It should be noted that, if the installation requires spacing between posts that is shorter than 96", the user will be required to saw a portion off of the top rail and bottom rail in order to fit between the posts. However, in Santa Fe (horizontal board) embodiments of the present invention, a bottom rail and a top rail are not required. Further bolts are not required as the necessary hardware is pre-installed at the factory. Instead, a board stop is employed to effectively manage ground clearance on any vertical installation using solid pickets, and to permit the boards or rails to rest at the precise clearance required.
15. The user may then begin fence board installation. If the user has set the posts to be shorter than 90" apart, the user must first cut the horizontal fence boards to the correct length. The user measures the distance between the insides of the channel of the two posts, between which the fence boards will rest. The fence boards are cut to be ½" shorter than the distance measured in order to maintain ¼" gap between each end of the fence boards and the inside of each channel of each post. If the posts are 96" apart (eight feet), then no additional cutting is necessary. The fence boards are designed such that they are pre-cut to the maximum post spacing size. (210)
16. For Santa Fe fence installation, the fence boards are installed with the tongue of each fence board facing up, and the groove of each fence board facing down, such that they may interlock together. The user holds each fence board at an angle, and inserts one end into the channel of a post, then rotates the opposite end of the fence board down until it slides into the opposite channel of the second post, as shown in FIG. 10 and FIG. 11. (220).
17. For Mesa fence installation, mesa fence boards are installed with the groove of the first board disposed inside of one of the two posts, and the tongue facing outwards. (230) A bottom board is preferably first placed before the first mesa fence boards are installed as shown in FIG. 7.
18. After the first board is in place (of either the Mesa fence embodiment or the Santa Fe embodiment), the remaining fence boards may be placed into position such that the tongue of each board interlocks within the groove of the adjacent board. (240) The user is advised to not use a hammer to force the fence boards into position, as the composite fence boards could be damaged.
19. On Mesa fences, all of the fence boards may extend above the top of the posts, or end too far below the top of the posts. If this occurs, the user adjusts the bottom rail brackets to achieve the correct alignment. (255)
20. After all boards are aligned and in position, the user installs the top rail between the posts. (260) No fasteners are needed, as the top rail will be secured by the posts and end caps.
21. Finally, the user installs the post and rail cap, which is configured to slide into the top of the post, and extend over a portion of the top rail (if present). (270) The user positions the post and end cap such that it is centered over the post. The end cap (90) slides into a recessed slot (95) within a top portion of the post (30) as shown in FIG. 18. In all preferred embodiments of the present invention, screws and bolts are not required to complete installation, and the hardware employed is pre-installed at the factory to expedite and simplify installation.

It should be understood that multiple embodiments of the present invention are available simultaneously to provide choice to the user. In addition to the described Santa Fe Embodiment, depicting horizontal boards, and the Mesa embodiment, having vertical boards, a third ‘basic’ form of the present invention is also preferably available. Each embodiment of the present invention is preferably bundled as a kit, and each kit may be expanded with the purchase of additional modules if needed. The 'basic' embodiment kit includes two slotted vertical posts, 11 tongue and groove boards, two caps (for the top of the posts), and hardware. The Santa Fe embodiment kit preferably incudes two vertical slotted posts, 11 tongue and groove boards, two post caps, and hardware. The Santa Fe embodiment preferably has all of the parts and hardware pre-installed at the factory, minimizing the labor time of installation. No additional fasteners are required as long as the standard length are used. Further, no bottom rail or top rail is necessary for most models, aside from the Mesa embodiment. Similarly, the Mesa embodiment kit includes two vertical slotted posts, a bottom rail, a top rail, 11 tongue and groove boards, two post caps, and hardware. However, in preferred embodiments exhibiting horizontal boards (20), a bottom rail and a top rail are not needed due to the inclusion of the end caps (90) (which accomplish the duty of a top rail) and post cable spacer (310) with post cable grip(s) (320) (which accomplish the duty of a bottom rail).

Additionally, it should be understood that alternate embodiments of the present invention may be designed to be taller than six feet. For example, some embodiments of the present invention may be capable of installations up to 12 feet in height through the use of higher caliber posts. Other heights can also be accomplished, especially via the Santa Fe embodiment.

Finally, it should be understood that all embodiments of the present invention are configured to functionally block both wind and noise, as well as to act as a visual barrier for privacy. The interlocking nature of the components of the present invention enables the modules to block wind effectively, without gaps, preventing individuals from peering through the module. The composite material of the present invention, namely of the boards (20) and posts (30), provide effective sound dampening properties.

To clarify, the simplified component listing of a single fencing instance of the present invention, in comparison to the previous iteration of the present invention include the following:

U.S. Pat. No. 11,053,707 B2

| # of components | Component Name |
|---|---|
| 4 | Post Steele Channel |
| 2 | Bottom Bracket |
| 2 | Bolt, hex head 3/8-16 × 1 steel black |
| 2 | Chanel Nut 3/8-16 × 1 Steel black |
| 11 | Hollow fence board |
| 1 | Cap |
| 2 | Screw, 1/4- 20 × 1 Corrosion Resistant Self Drilling Black |
| 4 | Screw Hex head 3/8-1/2 Zinc Plated Steel |
| 4 | Nut, Thin Nylon-Insert Locknut 3/8 16 Zinc Plated steel |
| TOTAL | One section or panel |
| 32 | |

| # of components | Component Name |
|---|---|
| 2 | Posts Composite |
| 1 | Post cable spacer |
| 2 | Cable grip |
| 2 | Pin |
| 2 | Top Caps |
| 2 | Post Depht stick |
| 2 | Board stop |

-continued

U.S. Pat. No. 11,053,707 B2

| | |
|---|---|
| 11 | Hollow boards |
| TOTAL | One section or panel |
| 24 | |

Further, for the Santa Fe (horizontal boards) embodiment, the installer/user need only install:

Two posts
TwoTop Caps
Two Post Depth sticks
11 Hollow boards

A total of 17 components (listed above) are in need of manual assembly for the Santa Fe (horizontal) embodiment. The remaining components of the Santa Fe are pre-assembled from the manufacturing facility of the present invention.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An assembly process for a wind-resistant, sound-barricading fence comprising:

selecting a location for the fence;

digging holes in the ground at the selected location;

providing a plurality of posts, each having a U-shaped cross-section extending from a top to a bottom of each post, comprising opposing left and right sides and a bottom side defining a U-shaped channel, wherein each post is configured to hold boards within said U-shaped channel;

mounting the posts together in two-post and three-post sets;

wherein two-post sets are disposed in a back-to-back orientation with the bottom side of a first post flush against the bottom side of a second post, such that the U-shaped channels of each post face away from one another;

wherein three-post sets are disposed in a T-shape orientation with a first post and a second post aligned back-to-back with a third post disposed therebetween at a 90 degree angle to the first and second posts, with the bottom sides of the first and second posts flush against the left and right sides of the third post, facilitating a T-shaped post for three adjoining fence modules;

placing each set of posts in a respective one of the holes, each pair of adjacent sets of posts defining a corresponding fence module therebetween;

providing a plurality of post cable spacers, each affixed to opposing posts of each fence module, to accurately determine the correct spacing between the posts to ensure that their position is correct;

surrounding the posts with concrete;

providing a plurality of boards, each comprising a tongue extending along a first longitudinally-extending edge thereof and a groove extending along an opposing second longitudinally-extending edge thereof, enabling the boards to interlock together;

providing a plurality of board stops, disposed at bottoms of the U-shaped channels of the posts such to engage a bottommost board of each fence module, preventing the boards from traversing the entirety of the U-shaped channel, and preventing contact of the boards with the ground;

providing a plurality of post cable grips, each centered on the bottommost board of each fence module, wherein the post cable grip is disposed in fixed communication with the post cable spacer, to ensure adequate support for the boards via the post cable spacer;

placing the boards horizontally between the opposing posts of each fence module;

disposing the boards within the U-shaped channels of the posts of each fence module such that the tongue of each board interfaces with the groove of the subsequent board until the boards extend to a top of the posts, wherein the U-shaped channels function as guides for the boards;

placing an end cap atop each post, locking the boards in position; and controlling wind and sound by blocking a portion of wind and sound via a composite hollow structure of the boards.

* * * * *